March 1, 1932.  A. F. WENDLER  1,847,368
DUST SEPARATION
Filed May 14, 1926
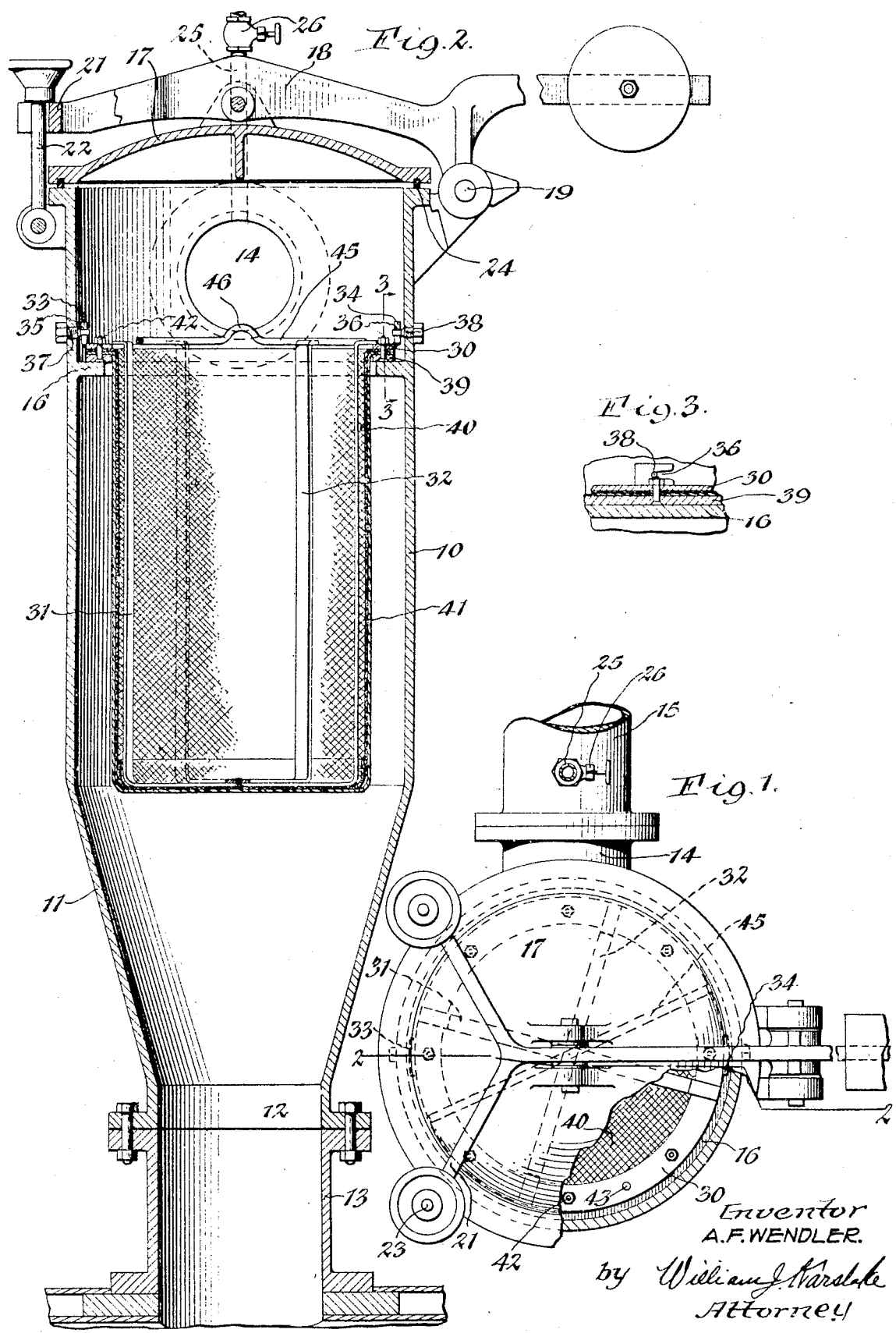
Inventor
A. F. WENDLER.
by William J. Warslake
Attorney Patented Mar. 1, 1932

1,847,368

UNITED STATES PATENT OFFICE

ADOLPH F. WENDLER, OF BUFFALO, NEW YORK, ASSIGNOR TO NATIONAL ANILINE & CHEMICAL CO., INC., OF NEW YORK, N. Y., A CORPORATION OF NEW YORK

DUST SEPARATION

Application filed May 14, 1926. Serial No. 109,068.

This invention relates to the separation of dust from gases and the recovery of the separated dust.

Dusting, or the entrainment of dust in the vapors drawn from a drier or an equivalent operation, is a condition requiring correction not only to avoid pollution but to recover the values present. For this purpose, cloth filters are found most desirable; they have the disadvantage, however, that they rapidly become clogged with dust which must be removed in some manner. One method adopted is a frequent reversal of the gas current to dislodged dust from the cloth, but obviously this interferes with the drier or with other operations being carried out. A further disadvantage is that some of the dust passes through the cloth and this in time builds up a dust deposit on the departure side of the cloth as well as on the approach side and effectively interferes with the gas or vapor flow.

It is an object of this invention to provide a dust separation that is substantially automatic and largely obviates handling of the dust. A further object is the use of cloth filters for this purpose so interposed in the path of a dust laden gas current that dust is substantially removed on the approach side of the filter. A further object is a mounting of a cloth filter for discharging separated dust without necessitating reversals of the gas current, and automatically returning dust to the apparatus giving rise thereto.

Another object is an arrangement that promotes separation of dust on the departure side as well as the approach side of the filter. Another object is an arrangement that provides for the ready removal of dust collected on the departure side of the filter. These and other objects will appear from the following description.

In general, these objects are accomplished by the suspension of a cloth filter in the path of an upwardly flowing gas current, the adoption of a depending bag form of filter, and the provision of a side outlet beyond the filter. With an upwardly moving gas current, the separated dust is held to the bag only by its adhesion and the pressure of the gas current. As the dust accumulates the particles agglomerate and their weight increases until it is sufficient to overcome these effects and the separated dust accordingly flakes off and is preferably returned directly to the drier or equivalent apparatus to avoid handling. The bag form of filter not only presents an extended area of contact, creating a relatively quiescent zone in close proximity to the filter, but it deflects the gas current in its passage therethrough thus furthering dust separation; this action is accentuated by the passage of the gas current inward of the bag. The side outlet above the bag causes further deviation with consequent dust precipitation and also affords a clear passage for the removal of the dust bag suspended within the casing.

In the accompanying drawings

Fig. 1 is a top view partly in section:

Fig. 2 is a vertical cross section on line 2—2 of Fig. 1; and

Fig. 3 is a section on line 3—3 of Fig. 2.

A cylindrical casing 10 has a lower hopper shaped portion 11 with a flanged bottom opening 12 to be bolted to the vapor outlet 13 of a drier. While designed for use with a drier, it is apparent that the structure is useful with other types of apparatus, or in addition to a dust collector. At the upper end of the cylindrical portion is a lateral outlet 14 connected to the suction or gas removal line 15 and below the outlet there is an inwardly extending flange or ledge 16. A cover 17 closes the upper end of the casing. The cover is pivoted on a clamp 18 hinged to one side of the casing, as at 19, and with two free ends 20, 21 locked by hinge bolts 22, 23. A gasket 24 provides a tight joint between the cover and the casing. For cutting off the suction and supplying a reverse current of air a branch line 25 controlled by a valve 26 is inserted in the suction line 15.

The bag member comprises a strap ring 30 of a size sufficiently small to fit within the casing but sufficiently large to be retained by the flange or ledge 16. To this strap are secured the upper ends of U-shaped braces 31, 32; lugs 33, 34 are welded to the edge of the ring. These lugs have slots 35, 36 slightly inclined to engage the projecting ends of bolts 37, 38 which are threaded through the casing wall. A second strap ring 39 of the same size as the ring 30 forms a clamp with the latter to hold between them a wire mesh 40 and an enclosing cloth bag 41 maintained in distended condition by the braces and the wire mesh; screws or bolts 42 secure the rings together. The bag may be of any suitable material such as hair-cloth, canvas or wool felt, and is preferably of a character that does not seriously affect the suction within the drier or equivalent apparatus. The assembly of the braces 31 and 32, wire mesh 40, bag 41, and rings 30 forms a cup-shaped, or closed bottom cylindrical, screening member which rests on the ledge 16, and which, being of smaller cross-sectional area than the cylindrical casing 10, leaves an annular passage 50 for the dust-laden vapors between the bag and the casing. A removable dowel pin 43 extending through the rings and into the flange may be used to lock the rings in place. A rod 45 having a loop 46 formed therein is welded to the ring 30 so that the bag can be lifted out of the casing.

As the filter is mounted in the suction line, vapors that are drawn off pass upward into the casing 10, a portion of them passing through the bag 41 at its bottom and a portion of them being deflected by the bottom of the bag and passing upward into the annular passage 50, where they are again deflected by the ledge 16, on which the bag assembly rests, and caused to pass through the side walls of the bag 41 into the interior of the bag. As the outlet 14 of the casing is above the top of the bag and laterally beyond its periphery the vapors passing through the bag must again change their direction in leaving the chamber. The separated dust agglomerates on the outside of the bag, and due to its own weight and vibration of the bag drops from the bag back into the drier to mix with the original charge. The action is accordingly substantially automatic and avoids handling of the greater portion of the dust. Some of the dust particles are drawn through the cloth mesh and the relatively quiescent condition near the cloth surface promotes their separation; the deflection of the gas current above the bag aids further separation of dust. As the bag is locked to the casing, the suction does not displace it and the metal form, about which the bag is drawn, holds the latter in a distended condition. At the end of a drying or other operation, air is admitted to destroy the suction; and the reversed gas current so created is passed through the bag which not only returns dust particles, drawn into the cloth meshes and clinging to the exterior of the bag, but also promotes settlement of dust within the bag. Accordingly when the casing is opened by throwing back the cover, the bag with the contained dust is readily lifted from the casing without the inconvenience and annoyance of substantial amounts of free dust in the atmosphere. Presence of steam or other vapor does not interfere with the dust separation, particularly if a heat insulating jacket is provided to prevent undue condensation.

I claim:

1. A dust separation apparatus including in combination a casing having an outlet, a seat extending from the inner wall of said casing below said outlet, a depending bag filter detachably supported by a ring on said seat, said bag enclosing a wire mesh and being maintained in a distended condition against said wire mesh by means of U-shaped braces extending from said ring, and means for introducing dust laden gas into said casing below said seat.

2. A dust separation apparatus including in combination a casing having a gas inlet and a gas outlet, a seat extending from the inner wall of said casing, a strap ring resting on said seat and supporting a filtering medium, a wire mesh enclosed by said filtering medium and supported from said ring, braces extending from said ring for supporting said filtering medium in an extended condition, a spider hinged to the top of said casing and a cover hinged to said spider.

3. A method of dust separation which comprises passing a gas flowing upwardly from a vessel and laden with dust through a filtering medium to separate dust, removing dust separated by said medium from said medium and causing it to return to the vessel, and deflecting the gas current after its passage through the medium to separate additional dust in a zone above the filtering medium, whereby said additional dust falls upon said filtering medium.

4. In an apparatus for the removal of dust from the vapors given off by a drier for solid material, the combination of a cylindrical casing open at the bottom and the top, said bottom opening forming an inlet for the dust-laden vapors, means on said casing for mounting it directly above the drier in the vapor-discharge line thereof, a ledge on the inner wall of the casing, a bag filter depending from the ledge and forming with the casing an annular passage closed at its top, said filter being removable through the opening in the top of the casing, an outlet in the wall of the casing above the bag filter, and a cover for the opening in the top of the casing.

In testimony whereof I affix my signature.

ADOLPH F. WENDLER.